United States Patent [19]

Martin et al.

[11] Patent Number: 5,003,815
[45] Date of Patent: Apr. 2, 1991

[54] ATOMIC PHOTO-ABSORPTION FORCE MICROSCOPE

[75] Inventors: Yves Martin, Briarcliff Manor; Hemantha K. Wickramasinghe, Chappaqua, both of N.Y.

[73] Assignee: International Business Machines Corporation, Armonk, N.Y.

[21] Appl. No.: 424,377

[22] Filed: Oct. 20, 1989

[51] Int. Cl.$^5$ .................. G01B 15/00; G01B 11/30
[52] U.S. Cl. ................................ 73/105; 250/305; 250/352; 374/6
[58] Field of Search .............. 73/105, 104; 250/305, 250/336.1, 393, 395, 526, 216, 338.1, 341, 352; 374/6, 45, 7

[56] References Cited

U.S. PATENT DOCUMENTS

| | | | |
|---|---|---|---|
| 3,617,745 | 11/1971 | Reed | 250/352 X |
| 3,629,499 | 12/1971 | Carlson | 250/352 X |
| 3,667,846 | 6/1972 | Nater et al. | 374/6 X |
| 3,794,838 | 2/1974 | Weiss et al. | 250/352 X |
| 4,343,993 | 8/1982 | Binning et al. | 250/306 |
| 4,724,318 | 2/1988 | Binning | 250/306 |
| 4,747,698 | 5/1988 | Wichramasinghe et al. | 374/6 |
| 4,918,309 | 4/1990 | Beha et al. | 250/306 |

FOREIGN PATENT DOCUMENTS

| | | | |
|---|---|---|---|
| 113844 | 7/1983 | Japan | 250/305 |
| 31112 | 2/1985 | Japan | 250/305 |
| 47601 | 2/1988 | Japan | 73/105 |
| 30413 | 12/1988 | Japan | 73/105 |
| 113643 | 5/1989 | Japan | 250/305 |
| 1427180 | 9/1988 | U.S.S.R. | 73/105 |

OTHER PUBLICATIONS

"IBM Images Surfaces by Electron Tunneling"; *Science*, vol. 220; 1 Apr. 1983; pp. 43-44, Arthur L. Robinson.
"Photothermal Modulation of the Gap Distance in Scanning Tunneling Microscopy" Appl. Phys. Lett. 49(3) Jul. 21, 1986, Amer et al.
"Atomic Force Microoscope-Force Mapping and Profiling on a Sub 100-Å Scale" J. Appl. Phys. 61(10), 15 May 1987, pp. 4723-4729, Martin et al.
"High-Resolution Capacitance Measurement and Potentiometry by Force Microscopy" Appl. Phys. Lett. 52(13), pp. 1103-1105, Mar. '88, Martin et al.
"Tunneling Spectroscopy" 1988 Elsevier Science Publishers B. V., pp. 141-156, Nelissen et al.
"Atomic Force Microscope" Physical Review Letters, vol. 56, No. 9, 3 Mar. 1986, pp. 930-933, Binning et al.

Primary Examiner—Tom Noland
Attorney, Agent, or Firm—Perman & Green

[57] ABSTRACT

An Atomic Photo-Absorption Force Microscope 1 includes an Atomic Force Microscope 10 and a radiation source 20 having an output radiation 22 wavelength selected to be preferentially absorbed by atoms or molecules associated with a sample surface 24a under investigation. Absorption of the radiation raises at least one outer shell electron to a higher energy level, resulting in an increase in radius of the atom or molecule. A tip 12 coupled through a lever 14 to the Atomic Force Microscope 10 is scanned over the surface and operates in conjunction with a laser heterodyne interferometer 18 to directly measure the resulting atomic or molecular increase of size, thereby detecting both the presence and location of the atoms or molecules under instingation. Operation in an a.c. mode by chopping the incident radiation 22 and measuring the corresponding a.c. induced tip movement beneficially increases the sensitivity of the technique, particularly if the a.c. frequency is chosen at a resonance of the tip-lever combination.

16 Claims, 1 Drawing Sheet

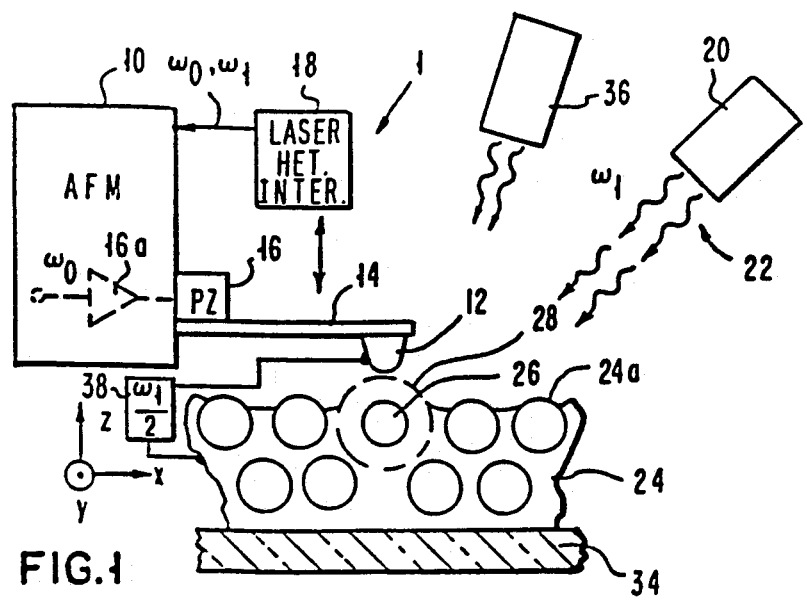
FIG. 1
FIG. 2
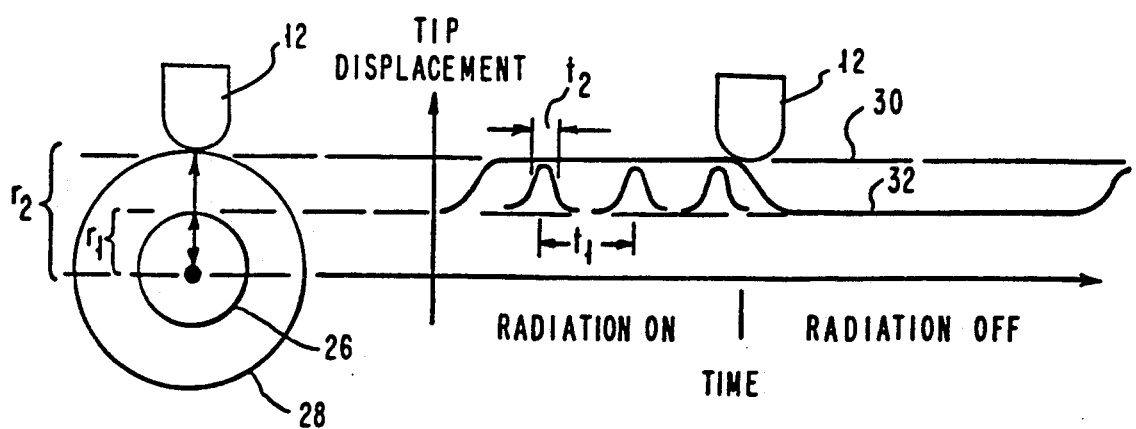

ATOMIC PHOTO-ABSORPTION FORCE MICROSCOPE

FIELD OF THE INVENTION

This invention relates generally to spectrographic method and apparatus and, in particular, to an Atomic Force Microscope used with a source of radiation selected to be absorbed by atoms or molecules to be investigated. A cantilevered vibrating tip of the Atomic Force Microscope is scanned over an illuminated sample surface and directly detects and measures the resulting atomic or molecular increase of size, thereby detecting both the presence and location of the atoms or molecules under investigation.

BACKGROUND OF THE INVENTION

The term microscopy is employed where a surface is imaged with radiation of a same energy. Where radiation of different or varying energies is used the term spectroscopy is generally employed. Dual purpose instruments are generally designated as microscopes even when they perform spectroscopic investigation as well.

Spectroscopic analysis of surfaces at atomic scales is desirable for a number of reasons, including the identification and characterization of surface impurities in semiconductor, superconductive and other structures.

In U.S. Pat. No. 4,343,993, Aug. 10, 1982, Binnig et al. describe a vacuum electron tunneling effect that is utilized to form a scanning tunneling microscope. In an ultra-high vacuum at cryogenic temperature, a fine tip is raster scanned across the surface of a conducting sample at a distance of a few Angstroms. The vertical separation between the tip and sample surface is automatically controlled so as to maintain constant a measured variable which is proportional to the tunnel resistance, such as tunneling current.

In a journal article entitled "Atomic Force Microscope", Physical Review Letters, Vol. 56, No. 9, G. Binnig et al. at pages 930–933 described an atomic force microscope that is said to combine the principles of the scanning tunneling microscope and a stylus profilometer.

In U.S. Pat. No. 4,724,318, Feb. 9, 1988, Binnig describes an atomic force microscope wherein a sharp point is brought near enough to the surface of a sample to be investigated that forces occurring between the atoms at the apex of the point and those at the surface cause a spring-like cantilever to deflect. The cantilever forms one electrode of a tunneling microscope, the other electrode being a sharp tip. The deflection of the cantilever provokes a variation of the tunnel current, the variation being used to generate a correction signal which can be employed to control the distance between the point and the sample. In certain modes of operation, either the sample or the cantilever may be excited to oscillate in a z-direction. If the oscillation is at the resonance frequency of the cantilever, the resolution is enhanced.

In U.S. Pat. No. 4,747,698 Wickramasinghe et al. describe a scanning thermal profiler wherein a fine scanning tip is heated to a steady state temperature at a location remote from the structure to be investigated. Thereupon, the scanning tip is moved to a position proximate to, but spaced from the structure. At the proximate position, the temperature variation from the steady state temperature is detected. The scanning tip is scanned across the surface structure with the temperature variation maintained constant. Piezo electric drivers move the scanning tip both transversely of, and parallel to, the surface structure. Feedback control assures the proper transverse positioning of the scanning tip and voltages thereby generated replicate the surface structure to be investigated.

In a journal article entitled "Atomic Force Microscope-Force Mapping and Profiling on a Sub 100-A Scale", J. Appl. Phys. 61 (10), 15 May 1987, Y. Martin et al., at pages 4623–4729 describe a technique for accurate measurement of the force between a tip and a material, as a function of the spacing between the tip and the material surface. The technique features a tip that is vibrated at close proximity to a surface in conjunction with optical heterodyne detection to accurately measure the vibration of the tip. The technique enables the measurement of tip displacements over large distances and over a wide range of frequencies, which is a major advantage over the previous methods. The technique is applicable to non-contact profiling of electronic components on scales varying from tens of microns to a few tens of angstroms. A second application is described wherein material sensing and surface profiling are achieved simultaneously.

In a journal article entitled "High-resolution capacitance measurement and potentiometry by force microscopy", Appl. Phys. Lett. 52 (13), Y. Martin, D. W. Abraham and H. K. Wickramasinghe at pages 1103–1105 describe an atomic force microscope employed for potentiometry and for imaging surface dielectric properties through the detection of electrostatic forces.

The electron tunneling effect is shown to be applicable to spectroscopic analysis is a journal article entitled "Tunneling Spectroscopy", B. J. Nelissen and H. van Kemper, Journal of Molecular Structure, 173 (1988) at page 141-156. This article describes the use of the Scanning Tunneling Microscope as a spectroscopic probe. These authors note that spectroscopic methods use energetic probes, usually photons, to gain desired information. They further note that for spectroscopy in conducting solids the use of photons is not an obvious choice, since the electrons inside the solid can be used as spectroscopic probes.

In a journal article "Photothermal Modulation of the Gap Distance in Scanning Tunneling Microscopy", Appl. Phys. Lett. 49 (3), 21 July 1986, by Nabil M. Amer, Andrew Skumanich and Dean Ripple at pages 137–139 describe the use of the photothermal effect to modulate the gap distance in a tunneling microscope. In this approach, optical heating induces the expansion and buckling of a laser-illuminated sample surface. The surface displacement can be modulated over a wide frequency range, and the height (typically § 1 Angstrom) can be varied by changing the illumination intensity and modulation frequency. The method is said to provide an alternative means for performing tunneling spectroscopy.

As is apparent the Scanning Tunneling Microscope (STM) and the Atomic Force Microscope (AFM) have provided an efficient and accurate means to perform the observation of atomic features on surfaces However, such prior art techniques have not overcome the problem of providing an efficient and accurate means to perform spectroscopy on the atomic and/or molecular scale, although certain attempts have yielded some limited results, namely voltage spectroscopy in STM, "peak force detection" spectroscopy with the AFM, temperature spectroscopy with the Thermal Profiler, and Auger spectroscopy with a Field emission microscope.

It is thus an object of the invention to provide apparatus and method for performing spectroscopy at atomic scales.

It is another object of the invention to provide method and apparatus for practicing Atomic Photo-Absorption Force Microscopy (APAFM) that beneficially combines both atomic resolution and spectroscopy for use in wide range of analytical applications.

SUMMARY OF THE INVENTION

The foregoing problems are overcome and the objects of the invention are realized by an Atomic Photo-Absorption Force Microscope constructed and operated in accordance with the invention. In accordance with the invention a radiation source has a wavelength selected to be preferentially absorbed by atoms or molecules associated with a sample surface under investigation. Absorption of the radiation raises at least one outer shell electron to a higher energy level, resulting in an increase in radius of the atom or molecule. A tip coupled through a lever to an Atomic Force Microscope is scanned over the surface and operates to directly measure the resulting atomic or molecular increase of size, thereby detecting both the presence and location of the atoms or molecules under investigation. Operation in an a.c. mode by chopping the incident radiation and measuring the corresponding a.c. induced tip movement beneficially increases the sensitivity of the technique, particularly if the a.c. frequency is chosen at a resonance of the tip-lever combination.

In accordance with a method of the invention there is disclosed a method of performing spectroscopy at atomic scales. The method includes a step of illuminating a sample with radiation having a characteristic wavelength selected for being absorbed by atoms or molecules of interest such that at least one outer shell electron is raised to a higher energy level, resulting in an increase in a radius of the atom or molecule. The method includes a further step of translating a probe tip proximal to the surface of the sample, the probe tip being mounted such that it experiences a detectable movement in response to being positioned near to an atom or molecule of increased radius. The method also includes a step of detecting the movement of the probe tip for indicating the presence of the atoms or molecules of interest. The probe tip has at least two characteristic resonant frequencies and the step of illuminating includes a step of chopping the radiation at a frequency substantially equal to a first one of the characteristic resonant frequencies. Furthermore, the step of translating includes a step of oscillating the probe tip perpendicularly to the surface at a second one of the characteristic resonant frequencies.

BRIEF DESCRIPTION OF THE DRAWING

The above set forth and other features of the invention will be made more apparent in the ensuing Detailed Description of the Invention when read in conjunction with the attached Drawing, wherein:

FIG. 1 is a block diagram, not drawn to scale, illustrating the APAFM of the invention disposed relative to a sample; and FIG. 2 is a diagram that illustrates APAFM tip displacement as a function of atomic radius and illuminating radiation.

DETAILED DESCRIPTION OF A PREFERRED EMBODIMENT OF THE INVENTION

FIG. 1 illustrates an APAFM 1 disposed relative to a sample. The APAFM 1 includes an Atomic Force Microscope (AFM) 10 that is similar in many operational characteristics to the AFM described in the above mentioned journal article entitled "Atomic Force Microscope-Force Mapping and Profiling on a Sub 100-A Scale", J. Appl. Phys. 61 (10), 15 May 1987, Y. Martin et al., at pages 4623–4729. The AFM 10 is configured to operate in a repulsive force mode. A tungsten tip 12 disposed at the end of a wire lever 14 is mounted on a piezoelectric transducer 16. The transducer 16 is driven by a source 16a of alternating current (a.c.) and vibrates the tip along a z-axis at the resonant frequency of the wire lever 14, which acts as a cantilever. A laser heterodyne interferometer 18 accurately measures the amplitude of the a.c. vibration. The tip/lever combination (12,14) is also coupled to suitable piezoelectric transducers (not shown) for being translated along an x axis and a y axis parallel to a surface 24a of a sample 24.

In an illustrative embodiment of the invention the lever/tip (14,16) is a unitary body comprised of a tungsten rod, etched into a cone, having a length of approximately 460 microns, a base diameter of approximately 15 microns, and a final tip diameter of approximately 0.1 micron. The last 40 microns of the cone are bent at 90°. The tip spring constant k, the first and the second resonant frequency and the Q factor of the lever were determined to be 7.5 N/m, 72 kHz, 200 kHz and 190, respectively.

It should be understood that these tip and other characteristics are exemplary and are not to be construed in a limiting sense. Also, it should be understood that while there is no intent to limit the scope of the present invention by the theory presented below, this theory is believed to be both accurate and consistent with observable facts and accepted scientific principles.

The APAFM 1 further includes a radiation source 20 that provides periodic, chopped radiation, indicated by the numeral 22, of selected wavelength to illuminate the sample 24 disposed within the vicinity of the tip 12. The radiation 22 is preferentially absorbed at the sample 24 surface 24a by exciting electrons of atoms 26, or molecules, to a higher energy state 28. One suitable radiation source is a focussed and chopped tunable laser, such as a dye laser or a frequency doubled dye laser. The required wavelength may vary from the near infrared, which is required to probe molecular bonds, up to ultraviolet which is required to excite electrons on low atomic orbitals. An acoustooptical-type modulator can be employed to chop the radiation beam. Typically the chopping frequency is selected to coincide with the lowest resonant frequency of the lever/tip (14,16), or 72 kHz for the embodiment discussed herein. The absorption of the radiation 22 results in an increase in radius of the atom or molecule from a first radius (r1) to a second larger radius (r2).

In accordance with the invention the radiation source 20 has a wavelength selected to be preferentially absorbed by atoms or molecules of interest. The tip 12 is scanned parallel to and proximal to the surface 24a and operates to directly measure the resulting atomic or molecular increase of radius, thereby detecting both the presence and location of the atoms or molecules under investigation. Operation in an a.c. mode by chopping the incident radiation 22 and measuring the corresponding a.c. induced tip 12 movement has been found to beneficially increase the sensitivity of the technique, particularly if the a.c. frequency is chosen at a resonance of the tip-lever combination.

The tip/lever combination (12,14) resonates at two frequencies $\omega_0$ and $\omega_1$ and the AFM 10 detects both of these frequencies. From the vibration at $\omega_1$, generated by the source 16a, the AFM 10 controls the spacing between tip 12 and sample 24 and displays the surface topography. The radiation 22 is chopped at $\omega_1$ and the spectroscopy of surface 24a is derived from the tip 12 vibration at $\omega_1$.

The invention advantageously exploits the characteristic of atomic structure that causes the radius of an electronic orbital of an atom to increase roughly with $n^2$, where n is the principal quantum number of the orbital. According to Slater's orbitals, the radius of an atomic orbital has a value $n^2/(Z-s)$ in units of Bohr radii, where Z is the atomic number and (s) is some screening factor smaller than Z. It is apparent from this formula that the size difference between two adjacent orbitals at the periphery of an atom is of the order of one angstrom. In the example of Rb+ which has 36 electrons, the approximate radii for the orbitals 1s, 2s and 2p, 3s 3p and 3d, 4s and 4p are 0.1, 0.3, 0.9 and 3 Angstroms, respectively. The orbital of higher order (n=5) that corresponds to an excited state of Rb+ exhibits a significantly larger radius of approximately 6.0 Angstroms.

The "apparent" size of an atom or molecule is very similar to the size of the external electronic orbital, as far as bonds with other atoms or forces are concerned. Hence, exciting an atom by bringing an electron to an orbital larger than the last normal orbital of the atom significantly increase the apparent size of that atom, by up to several Angstroms.

The lifetime of an excited atom depends widely on a number of factors including radiative or non-radiative decay to the fundamental state and coupling to the surrounding media. For a radiative decay in the case of a strongly allowed electric-dipole atomic transition in the optical frequency, as is exploited in the APAFM 1, a value quoted by Siegman in "An Introduction to Lasers and Masers", McGraw-Hill (1971) at page 100 is 10 nanoseconds (ns). However, atoms in a crystal or solid can exhibit more rapid non-radiative decays, down to picoseconds (ps), due to a strong coupling of the internal atomic oscillations to the surrounding crystal lattice. However, even in this case a few transitions of selected atoms in solids are so decoupled from lattice vibrations that they have relatively long lifetimes. For example, $Nd^{3+}$ in a has a 4 millisecond (ms) lifetime [Siegman, p. 101-2].

Although it may seem apparent that the lifetime of the excited state is a dominant and important factor for successful operation of the APAFM 1 such may not be true for several reasons.

Firstly, the tip 12 of the AFM 10 does not measure an average size of the atom, but the "peak" (r2) size of the atom, as shown in FIG. 2. In FIG. 2, t1 is the average time interval between incident photons and t2 is the life time of an excited atom or molecule. By example, with a maximum radiation 22 flux of 1mW focused within a one micron spot, corresponding to $10^7$ photons per second, the duty cycle (t2/t1) of the atom in the excited state may be very small, as depicted by the narrow peaks in the diagram of FIG. 2. Due to the strong repulsive forces between the tip 12 and the atom, and because the tip 12 cannot follow the fast transitions of the atom, the tip is repelled from the atom to a distance 30 dictated by radius (r2) of the excited state. The tip 12 maintains this distance 30 during the on-time of the incident radiation 22 and approaches the radius r1 of the orbital of the ground state (distance 32) when the radiation 22 is off. The radiation chopping frequency is thus preferably tuned to a resonance of the tip-lever (12,14) to increase sensitivity.

Secondly, a consideration of energy is even more appropriate in sensing atomic size variations with the tip 12. The transitions that are considered are transitions from a high order orbital to a non-populated external orbital, i.e. Balmer (from n=2), Paschen (n=3) or Brackett (n=4) transitions. The associated photon energy is typically a few electron volts (eV). This energy of the incident photons is the energy that eventually moves the tip 12. It can be shown that the energy required to move the tip 12 is the spring energy:

$$E_{spring} = \frac{1}{2}\frac{kx^2}{Q} = \frac{10^2 \; 10^{-20}}{2 \; 200} \tag{1}$$

For k=100N/m, x=1 Angstrom and Q=200 this required spring energy is much smaller than the energy of a single photon. Furthermore, several photons are contributing to the tip 12 displacement during each "on" alternate of the chopped radiation 22 frequency. Therefore, the presence of the tip 12 induces only a small perturbation to the atom that is being excited.

Bulk thermal expansion of the sample due to the radiation absorption may induce some spurious tip 12 vibration at the tip-lever resonances. These spurious vibrations are minimized by mounting the sample 24 on a transparent holder 34 so that radiation absorption will occur only by those atoms whose transition is tuned to the radiation wavelength. Additionally, thermal effects may be suppressed by employing a second radiation source 36 having a wavelength that differs from the wavelength of source 20. The source 36 is chopped out of phase with the first radiation source 20 and heats the bulk of the sample 24 so that its temperature and thermal expansion remain substantially constant in time. In practice the amplitude, chopping frequency and phase of the source 36 may be varied or adjusted to obtain a desired degree of cancellation of spurious oscillation due to thermal effects.

For an electrically conductive sample, or a thin sample disposed upon an electrically conducting substrate, spurious vibration may be cancelled by employing an electrostatic force. The electrostatic force is generated by applying an a.c. voltage between tip 12 and sample 24 in a manner disclosed in the aforementioned journal article entitled "High-resolution capacitance measurement and potentiometry by force microscopy", Appl. Phys. Lett. 52 (13), Y. Martin, D. W. Abraham, H. K. Wickramasinghe. Preferably the a.c. signal has a frequency that is approximately one half of the lower resonant frequency, or 36 kHz for this embodiment, indicated by the source 38 designated by $\omega_{1/2}$.

The energy of the electronic transitions actually detected may differ from the orbital energies tabulated by using classical methods. That is, in the APAFM 1 the atoms being illuminated are located at the surface 24a of the solid sample 24, as opposed to atoms within the bulk of a material as are typically considered by classical analytic technique. Thus, surface effects may influence the energy levels of the atoms. The presence of the tip 12 may also alter the energy levels, specially if the tip 12 is electrically biased. However, these factors need not be considered in a negative or limiting sense in that they allow new types of spectroscopy to be done. That is, atomic scale spectroscopy is accomplished that addresses surface atoms and that operates in accordance with functions of local parameters such as electric field force and surface effects.

The sensitivity of the APAFM 1, based on considerations of radiation flux and of photon and tip energies, is suitable for use with a number of materials including insulators, where tunneling and inverse photo-emission spectroscopy are not feasible.

Thus, while the invention has been particularly shown and described with respect to a preferred embodiment thereof, it will be understood by those skilled in the art that changes in form and details may be made therein without departing from the scope and spirit of the invention.

Having thus described our invention, what we claim as new, and desire to secure by Letters Patent is:

1. Spectroscopic apparatus comprising:
   means for illuminating a surface of a sample with radiation having a characteristic wavelength selected for being absorbed by atoms or molecules of interest such that the atoms or molecules of interest increase in radius;
   means for translating a probe tip proximal to the surface of the sample, the probe tip being mounted such that it experiences a detectable movement in response to being positioned near to an atom or molecule of increased radius; and
   means for detecting the movement of said probe tip for indicating the presence of the atoms or molecules of interest.

2. Spectroscopic apparatus as set forth in claim 1 wherein said means for translating and said means for detecting comprise an Atomic Force Microscope.

3. Spectroscopic apparatus as set forth in claim 1 wherein said means for detecting is comprised of a laser heterodyne interferometer.

4. Spectroscopic apparatus as set forth in claim 1 wherein said probe tip has at least two characteristic resonant frequencies and wherein said means for illuminating further comprises means for chopping the radiation at a frequency that is a function of a first one of the characteristic resonant frequencies.

5. Spectroscopic apparatus as set forth in claim 4 and further comprising means coupled to said probe tip for oscillating said probe tip at a second one of the characteristic resonant frequencies.

6. A method of performing spectroscopy at atomic scales comprising the steps of:
   illuminating a sample with radiation having a characteristic wavelength selected for being absorbed by atoms or molecules of interest such that at least one electron associated with the atom or molecule of interest is raised to a higher energy level, resulting in an increase in a radius of the atom or molecule;
   translating a probe tip proximal to a surface of the sample, the probe tip being mounted such that it experiences a detectable movement in response to being positioned near to an atom or molecule of increased radius; and
   detecting the movement of the probe tip for indicating the presence of the atoms or molecules of interest.

7. A method as set forth in claim 6 wherein the probe tip has at least two characteristic resonant frequencies and wherein the step of illuminating includes a step of chopping the radiation at a frequency substantially equal to a first one of the characteristic resonant frequencies.

8. A method as set forth in claim 7 wherein the step of translating includes a step of oscillating the probe tip perpendicularly to the surface at a second one of the characteristic resonant frequencies.

9. A method as set forth in claim 7 and including a step of cancelling spurious vibration of the sample due to bulk thermal expansion of the sample, the step of cancelling including a step of illuminating the sample with chopped radiation having a second wavelength that differs from the characteristic wavelength and that is chopped out of phase therewith.

10. A method as set forth in claim 6 and including a step of cancelling spurious vibration of the sample, the step of cancelling including a step of applying an a.c. voltage between the probe tip and the sample.

11. Apparatus for analyzing a sample comprising:
   means for illuminating a surface of a sample with a chopped radiation beam having a characteristic wavelength selected for being absorbed by atoms or molecules of interest such that at least one electron associated therewith is raised to a higher energy level resulting in an increase in a radius of the atom or molecule; and
   Atomic Force Microscope means comprising:
   means for translating a tip closely adjacent to the surface of the sample and means for maintaining the tip at a substantially constant distance from the surface of the sample, the tip experiencing a detectable movement in response to being positioned near to an atom or molecule of increased radius; and
   means optically coupled to the tip for detecting the movement of the tip for indicating the presence of the atoms or molecules of interest.

12. Apparatus as set forth in claim 11 wherein the means for detecting includes a laser heterodyne interferometer means.

13. Apparatus as set forth in claim 11 wherein the tip has at least two characteristic resonant frequencies and wherein the radiation is chopped at a frequency that is a function of a first one of the characteristic resonant frequencies.

14. Apparatus as set forth in claim 13 wherein the translating means includes means for oscillating the tip at a second one of the characteristic resonant frequencies.

15. Apparatus as set forth in claim 11 and further comprising means for cancelling spurious vibration of the sample due to bulk thermal expansion of the sample, the means for cancelling comprising:
   second means for illuminating the sample with radiation having a second wavelength that differs from the characteristic wavelength;
   means for chopping the radiation having the second wavelength out of phase with the radiation having the characteristic wavelength.

16. Apparatus as set forth in claim 11 and further comprising means for cancelling spurious vibration of the sample, the means for cancelling including means for applying an a.c. voltage between the tip and the sample.

* * * * *